Aug. 24, 1937.  R. F. KUNS  2,090,891
TRAILER COUPLER
Filed Aug. 10, 1935

INVENTOR
Ray F. Kuns
BY Leo P. Parker
ATTORNEY

Patented Aug. 24, 1937

2,090,891

UNITED STATES PATENT OFFICE 2,090,891

TRAILER COUPLER

Ray F. Kuns, Madisonville, Ohio

Application August 10, 1935, Serial No. 35,649

7 Claims. (Cl. 280—33.44)

The invention relates to means particularly adapted for use in making a safe and satisfactory double releasable coupling connection between a trailer or a semi-trailer and a passenger automobile.

Heretofore, users of two wheel trailers, intended to be connected to the rear of a truck, tractor or passenger motor vehicle, have utilized a coupler having contact with the rear of the tow or passenger motor vehicle and rearwardly of the rear axle of said tow vehicle. Sometimes it has been necessary to remove the spare tire, spare tire holder, trunk and other apparatus from the rear of the tow vehicle, or replace these accessories at a higher elevation or install new front fenders having fender wells in order to carry the spare tire at the forward part of the tow vehicle to permit connection of the tow bar of the trailer with the tow vehicle at its rear.

Also, it is well known that it is advantageous to distribute the weight on the tow bar of the semi-trailer and its load forward of the rear axle of the tow vehicle, rather than to distribute all or a greater portion of this weight rearward of the rear axle. It is, also, generally known that if the weight of the trailer and its load, supported by the tow car, is located at a point in the rear of or above the center of the rear axle of the tow car, that the same or greater vertical movements of the rear wheels of the tow vehicle are imparted to the front end of the trailer. Moreover, the downward pressure of the weight of the tow bar, or front end of the trailer, has a tendency to lift the forward end of the tow vehicle free from the roadway which results in broken front springs, rapid tire wear and in steering of the tow car being difficult and dangerous. This same unsatisfactory distribution of weight also results in overloading the rear axle. When the trailer or semi-trailer is coupled to the rear of the conventional passenger chassis it results in a very rough ride for passengers in the trailer. The pivoting action between the trailer chassis and the tow car chassis being to the rear of the rear axle of the tow car results in the rear of the trailer contacting the roadway when crossing curbs and gutters, owing to the greatly multiplied vertical movements of the rear wheels of the tow car and thereby resulting in damage to the trailer.

For these reasons, it is a desirable feature of trailer couplers that the weight and downward pressure of the front of the trailer or semi-trailer and its load be applied and distributed to all wheels of the tow vehicle, as by having the forward end or ends of the trailer tow bar connected or coupled forwardly of the center of the rear axle of the tow vehicle.

Therefore, the general object of the invention is to provide simple, practical and efficient means adapted for utilization in connecting a trailer to a tow or passenger car at two points forward of and substantially in horizontal alignment with the rear axle of said tow car and which means can be utilized without changing the fundamental design of the automobile, or removing and replacing accessories, such as trunks, spare tire holders, spare tires and bumper of the tow car.

Other objects of the invention are to provide a double point pivotal connection of said trailer with said tow car which will permit the trailer wheels to follow closely the tracks of the tow car; and to provide means to distribute the weight or downward pressure of the front part of the trailer and its load at a point forward of the rear axle of the tow car, whereby the four wheels of the tow car support said weight and the normal vertical movements of the front part of said trailer and said tow bar is considerably less than the vertical movements of the rear axle and wheels and front axle and front wheels of said tow car.

Other objects of the invention will be apparent by reference to the drawing, the hereinafter description, and the claims.

The invention consists in providing means which are capable of being utilized for coupling the trailer to the tow car at two points forward of the rear axle of said tow car and substantially in horizontal alignment therewith, and also in connecting said means to the trailer by utilization of pivotal mechanism adapted to pivot vertically and horizontally, and in provision of a swiveling mechanism which compensates for irregularities in road surfaces and transmits the weight of the forward end of said trailer to two points forward of the rear axle of said tow car and at each side of said tow car at which the trailer is connected with the tow car.

The invention, also, consists in the combination of the elements, arrangement of the parts and in the details of the construction, as hereinafter claimed.

Figure 1:
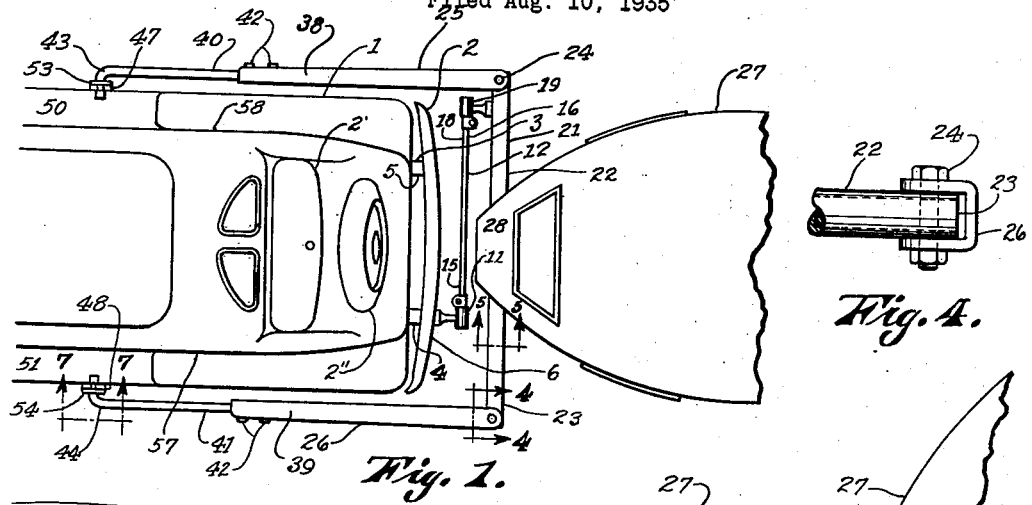
Fig. 1 is a plan view of the invention shown incorporated with a tow car partly broken away.
Figure 4:
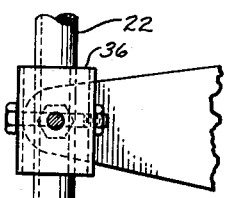
Fig. 4 is a section taken on a line corresponding to 4—4 in Fig. 1.
Figure 2:
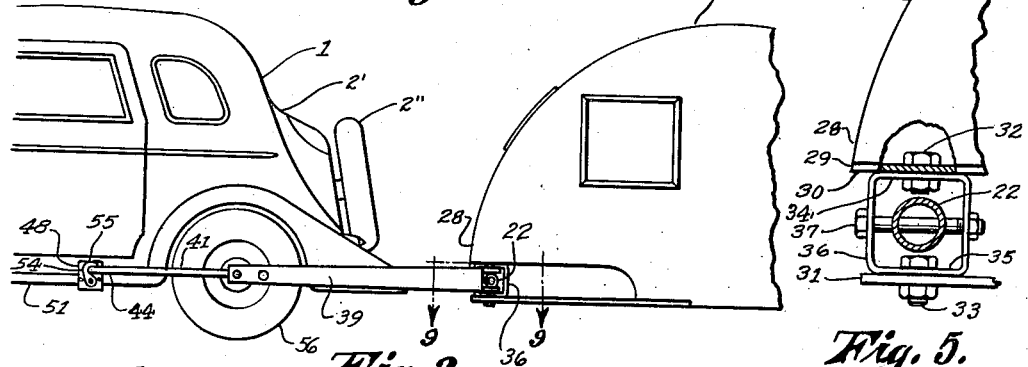
Fig. 2 is a side elevational view of the same.
Figure 5:
Fig. 5 is a section taken on a line corresponding to 5—5 in Fig. 1.
Figure 3:
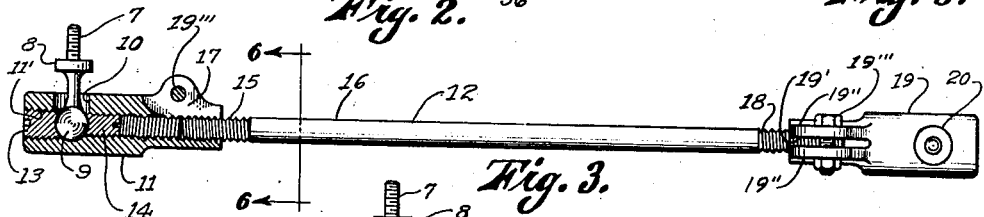
Fig. 3 is a side elevational view of the drag link, shown partly broken away.
Figure 6:
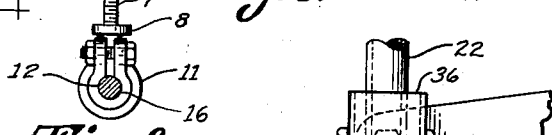
Fig. 6 is a section taken on a line corresponding to 6—6 in Fig. 3.
Figure 7:
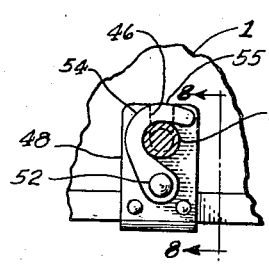
Fig. 7 is a section taken on a line corresponding to 7—7 in Fig. 1, with parts broken away.
Figure 8:
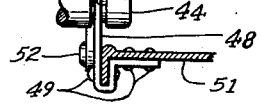
Fig. 8 is a section taken on a line corresponding to 8—8 in Fig. 7, showing parts broken away.
Figure 9:
Fig. 9 is a plan view of the cross arm connector and cross arm, showing parts broken away.

The preferred construction of the invention is exemplified with the tow or passenger car 1 which has the usual bumper 2 connected with the rear ends 3 and 4 of the frame 5 of the car 1. The trunk 2' and the spare tire 2" are connected, as usual, to the rear end of the car 1.

The usual bolt, which is used to secure the end 6, of the bumper 2, to the end 4, of the frame 5, is discarded and the threaded shank 7 is screwed in the usual hole in the end 4 of the frame. The shank 7 is integrally formed with the boss 8 which has integrally formed with its inner end the ball 9 received through the hole 10, in the sleeve 11, of the drag link 12. The sleeve 11 has therein the hole 11' whose side walls extend at right angles with the side walls of the hole 10 and has screwed therein the retainer screws 13 and 14 whose inner ends are cupped and have received in contact therewith the ball 9. The end 15, of the tire rod 16, is threaded in the hole 11' and to the inner end 17 of the sleeve 11. The other end 18, of the tie rod 16, has threaded thereto the sleeve 19 having pivoted therein a ball (not shown and similar to the ball 9) which has integrally formed therewith the boss 20 having integrally formed therewith a threaded shank which is fixed in the end 21 of the cross bar 22. Each of the inner ends of the sleeves 11 and 19 have the slots 19' therein and have integrally connected therein the spaced apart ears 19" through which is received the bolt 19''' for the purpose of fixing the inner ends of the sleeves to the ends of the tie rod 16. The ends 21 and 23, of the cross bar 22, are pivotally connected, as by the vertical bolts or king pins 24, to the rear ends of the arms 25 and 26 which are adapted to be pivoted laterally of the tow car 1.

The trailer 27 has fixed to its front end 28 a tow bar 29 which comprises the spaced apart frame members 30 and 31, respectively, having fixed thereto, as by the bolts 32 and 33, the upper and lower plates 34 and 35 of the rectangular connector or yoke 36. Extending through the rectangular yoke 36 is the cross bar 22 having received through its middle portion the horizontal bolt or pin 37 whereby the cross bar is adapted to be pivoted vertically while resisting any rotation about its axial line.

Each of the arms 25 and 26 comprise the channel plates 38 and 39 having their front ends fixed to the rear ends of the rods 40 and 41, as by the bolts 42. The rods 40 and 41 have their inner ends 43 and 44 bent inwardly and have therein the groove 45 adapted to be received in the slots 46 of the vertical plates 47 and 48 having their lower ends bent inwardly and fixed, as by the rivets 49, to the outer edges of the running boards 50 and 51 of the tow car 1.

Pivotally connected, to the plates 47 and 48, as by the bolts 52, are the hooks 53 and 54 whose curved ends 55 are adapted to be received over the ends 43 and 44 of the rods 40 and 41 for the purpose of preventing the forward ends of the arms 25 and 26 from being removed, as by vibrations of the tow car 1, from the slots 46 in the vertical plates 47 and 48 during travel of the tow car 1 and the trailer 27. The channel members 38 and 39, of the arms 25 and 26, extend horizontally and in alignment with the rear axle, of the tow car 1, on which the rear wheels 56 are rotatably mounted.

The forward ends 43 and 44, of the arms 25 and 26, are connected a relatively great distance forward of the rear axle of the car 1, whereby relatively small movements are imparted vertically to the front end 28, of the semi-trailer 27, when either the front wheels or the rear wheels of the tow car move vertically over an obstruction or depression in the highway. The drag link 12 is connected with the end 4 of the frame 5 which is adjacent the side 57, of the tow car 1, and connected with the end 21, of the cross bar 22, adjacent the side 58, of the car 1, whereby side movement of the cross bar 22, with respect to the car 1, is limited.

The king pins 24 are mounted in vertical positions, in the cross bar 22, and are maintained in vertical positions by the action of the bolt 37 in the rectangular yoke 36 which prevents the bar 22 rotating about its axis, so that weight of the semi-trailer 27 is borne by the several members comprising 30, 31, 33, 34, 36, 37, 22, 24, 25 and 26. The weight is transmitted forwardly and is received by the tow car through the plates 47 and 48.

An advantage of the invention is that the load of the front end of the trailer is supported by the two couplers on the running boards of the tow car whereby said weight of the semi-trailer is received at points forward of the rear axle of the tow car, thereby providing a practical disposition of the load weight of the semi-trailer on four wheels of the tow car whereby the stability of the tow car is assured and normal steering of the tow car is unchanged.

Still another advantage of the invention is that the installation of the supporting blocks on the running boards of the tow car is simple and the attachment of these supporting blocks is the only change of the tow car necessary to connect the trailer, whereby the spare tire holder, spare tire, trunk and bumper remain in their original positions on the tow car.

Still another advantage of the invention is that the rigid construction of the various parts, particularly with reference to weight carrying adaptability of the pivotal mechanism and the forwardly extending arms in connection with the drag link permits easy swiveling of the mechanism and, also, the arms are retained in fixed and adjusted position with respect to inward movements.

Still another advantage of the invention is that satisfactory and efficient braking of the tow car is provided because the weight of the forward part of the trailer is distributed in a highly desirable manner on four wheels of the tow car.

Still another advantage of the invention is that the trailer may be connected to or disconnected from the tow car quickly and conveniently and the forwardly extending arms may be turned through an arc of 180 degrees to be disposed rearwardly of the tow car under the semi-trailer front.

Still another advantage of the invention is that during ordinary travel, the vertical movements of the front or rear wheels of the tow car are not imparted to any great extent to the front of the trailer, because the front ends of the horizontal arms are connected between the front and rear axles of the tow car and at a point substantially in horizontal alignment with the rear axle of the tow car, whereby the vertical movements of the trailer being considerably reduced, when compared with the usual vertical movements imparted to a trailer attached to the rear end of the tractor, the trailer 27 rides with relative comfort to the occupants.

While I believe that the form of the invention illustrated in the drawing and referred to in the above description, as the preferred embodiment, is efficient and practicable, yet realizing that the conditions concurrent with the adoption of the device will necessarily vary, I desire to emphasize the fact that changes in the details may be resorted to, when required, without sacrificing any of the advantages of the invention as defined in the claims.

Various changes may be made in the general form and arrangement of mechanical parts described without departing from the invention. Hence I do not limit myself to the precise details of the materials or the size and shape thereof as set forth, but consider myself at liberty to make such changes and alterations as fairly fall within the spirit and scope of the appended and final claims.

What I claim as new and desire to secure by Letters Patent is:

1. The combination with a tow vehicle and a trailer having a tow bar, of a horizontal cross bar pivotally connected with said tow bar, horizontal arms pivotally connected with the ends of said cross bar and extending forwardly and adapted to be pivoted laterally, means to limit the inward pivotal movement of said arms, and means to pivotally connect the forward ends of said arms with the sides of said tow vehicle forward of the rear axle of said tow vehicle, said horizontal arms being substantially in alignment with said rear axle of said tow vehicle.

2. The combination with a tow vehicle and a trailer having a tow bar, of a cross bar extending transversely of said tow vehicle and being pivotally connected with said tow bar, horizontal arms pivotally connected with the ends of said cross bar and extending forwardly and adapted to be pivoted laterally, means to limit the inward pivotal movement of said arms, and means to pivotally connect the forward ends of said arms with the sides of said tow vehicle forward of the rear axle of said tow vehicle, said arms being substantially in alignment with said rear axle.

3. The combination with a tow vehicle and a trailer having a tow bar, of a horizontal pivot pin, a horizontal cross bar pivotally connected with said horizontal pivot pin through said tow bar, vertical pivot pins connected with the ends of said cross bar, horizontal arms connected with the ends of said cross bar by said vertical pins and extending forwardly and adapted to be pivoted laterally, means to limit the inward pivotal movement of said arms, and means to pivotally connect the forward ends of said arms with the sides of said tow vehicle forward of the rear axle of said tow vehicle, said horizontal arms being substantially in alignment with said rear axle of said tow vehicle.

4. The combination with a tow vehicle and a trailer having a tow bar, of a cross bar extending transversely of said tow vehicle and being pivotally connected with said tow bar, horizontal arms pivotally connected with the ends of said cross bar and extending forwardly and adapted to be pivoted laterally, and means to pivotally connect the forward ends of said arms with the sides of said tow vehicle forward of the rear axle of said tow vehicle, said arms being substantially in alignment with said rear axle.

5. The combination with a tow vehicle and a trailer having a tow bar, of a cross bar extending transversely of said tow vehicle and being pivotally connected with said tow bar, horizontal arms pivotally connected with the ends of said cross bar and extending forwardly and adapted to be pivoted laterally, and means to pivotally connect the forward ends of said arms with the running boards of said tow vehicle forward of the rear axle of said tow vehicle, said arms being substantially in alignment with said rear axle.

6. The combination with a tow vehicle and a trailer having a tow bar, of a cross bar extending transversely of said tow vehicle and being pivotally connected with said tow bar, horizontal arms pivotally connected with the ends of said cross bar and extending forwardly and adapted to be pivoted laterally, and means to pivotally connect the forward ends of said arms with the running boards of said tow vehicle forward of the rear axle of said tow vehicle.

7. The combination with a tow vehicle having running boards intermediate its front and rear wheels, and a trailer, of a pair of arms, draw bar means connected with said trailer, the rear ends of said arms being pivoted to said means and adapted to swing laterally, means to connect the front ends of said arms with said running boards, and means to limit the lateral movements of said arms.

RAY F. KUNS.